United States Patent
Okada et al.

(10) Patent No.: US 7,680,390 B2
(45) Date of Patent: Mar. 16, 2010

(54) POLYMER CLAD OPTICAL FIBER

(75) Inventors: Kenji Okada, Sakura (JP); Junichi Takahashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/439,376

(22) PCT Filed: Mar. 14, 2008

(86) PCT No.: PCT/JP2008/054784

§ 371 (c)(1),
(2), (4) Date: Feb. 27, 2009

(87) PCT Pub. No.: WO2008/114742

PCT Pub. Date: Sep. 25, 2008

(65) Prior Publication Data

US 2009/0196560 A1     Aug. 6, 2009

(30) Foreign Application Priority Data

Mar. 16, 2007   (JP) ............................. 2007-068761

(51) Int. Cl.
*G02B 6/00*      (2006.01)
*G02B 6/036*     (2006.01)

(52) U.S. Cl. ....................................... 385/142; 385/126

(58) Field of Classification Search .................. 385/123, 385/126, 127, 141, 142
See application file for complete search history.

(56) References Cited

U.S. PATENT DOCUMENTS 5,802,235 A * 9/1998 Akasaka ..................... 385/123

(Continued)

FOREIGN PATENT DOCUMENTS

JP      11-064665 A    3/1999

(Continued)

OTHER PUBLICATIONS

U. Kubo et al., "Laser Transmitted Characteristics of Multi-Mode Optical Fiber below Zero Degree of Frost (II)", Journal of the Faculty of Science and Technology, Sep. 30, 1987, pp. 193-196, No. 23, Faculty of Science and Engineering, Kinki University; Cited in ISR; Copy from ISR.

(Continued)

*Primary Examiner*—Charlie Peng
(74) *Attorney, Agent, or Firm*—Westerman, Hattori, Daniels & Adrian, LLP

(57) ABSTRACT

A polymer clad optical fiber is provided in which, if the diameter of an inner core is taken as $a_1$, and the diameter of an outer core is taken as $a_2$, and if a ratio X (which=$a_2^2/a_1^2$) between a cross-sectional area of the inner core and a cross-sectional area of the outer core is within a range of $1.8 \leq X \leq 2.2$, and if a relative refractive index difference between the inner core and the outer core is taken as $\Delta_1$, and if a relative refractive index difference between the outer core and a cladding is taken as $\Delta_2$, then for a parameter Y which is defined as $Y=\Delta_1/\Delta_2$, when a high temperature is taken as Ymax and a low temperature is taken as Ymin, a relationship is established in which, when X is within a range of $1.8 \leq X \leq 2.0$, then $0.25 \leq Ymin \leq 0.84X-0.68$, and Ymax is $0.25 \leq Ymax \leq 0.84X-0.68$, and, when X is within a range of $2.0 \leq X \leq 2.2$, Ymin is $0.48X-0.71 \leq Ymin \leq -2/9X+13/9$, and Ymax is $0.48X-0.71 \leq Ymax \leq -2/9X+13/9$.

3 Claims, 1 Drawing Sheet

U.S. PATENT DOCUMENTS

| | | |
|---|---|---|
| 6,078,715 A | 6/2000 | Fujii et al. |
| 6,952,519 B2 * | 10/2005 | Bickham et al. ............ 385/127 |
| 2004/0028361 A1 * | 2/2004 | Farroni et al. ............... 385/123 |
| 2004/0240814 A1 * | 12/2004 | Boek et al. .................. 385/123 |

FOREIGN PATENT DOCUMENTS

| | | |
|---|---|---|
| JP | 11-119036 A | 4/1999 |
| JP | 2005-321686 A | 11/2005 |

OTHER PUBLICATIONS

International Search Report of PCT/JP2008/054784, Mailing Date of Apr. 15, 2008.

* cited by examiner

POLYMER CLAD OPTICAL FIBER

TECHNICAL FIELD

The present invention relates to improvements in the temperature dependency of optical characteristics of a polymer clad optical fiber (referred to below as a PCF) having a two-layer core with step index profile. A PCF is mainly used in short-reach transmissions such as domestic wiring, office LAN, device internal wiring, in-vehicle communication, and the like.

BACKGROUND ART

Among PCFs which are formed of a quartz glass core, and of polymer cladding which is provided around this quartz glass core, in particular, PCF having a step index type (referred to below as an SI type) of refractive index profile have the advantage that they can be manufactured at low cost because it is not necessary for a dopant such as germanium to be added thereto. Moreover, because they have a large diameter and a high NA, they also have the feature that their coupling efficiency with a light source is excellent.

Conventionally, in order to improve characteristics such as the capacity of transmission and bending loss of an SI type of multimode fiber, a technology in which the core is formed of a multilayer structure including two or more layers has been disclosed in Patent document 1. Moreover, forming the core as a graded index (GI) type of refractive index profile is also disclosed in both Patent documents 2 and 3.

In particular, in order to improve temperature characteristics of the refractive index of the polymer cladding material of a PCF, a two-core structure is also disclosed in Patent document 3 in which fluorine-doped glass cladding is provided on a glass core, and a polymer cladding is then further provided on the outer circumference thereof.

[Patent document 1] Japanese Patent Application Laid-Open (JP-A) No. 2005-321686
[Patent document 2] Japanese Patent Application Laid-Open (JP-A) No. 11-64665
[Patent document 3] Japanese Patent Application Laid-Open (JP-A) No. 11-119036

DISCLOSURE OF THE INVENTION

Problems to be Solved by the Invention

Generally, in an optical fiber having an SI type of refractive index profile, in order to broaden the capacity of transmission, it is necessary to reduce the relative refractive index difference (typically represented by the symbol $\Delta$) between the core and the cladding.

However, if $\Delta$ is small, the problem arises that there is an increase in leakage of light when the transmission path is bent (i.e., bending loss).

At the same time, if there is an increase in the leakage of light from the core to the cladding layer, then an optical power loss in the optical fiber occurs in the polymer cladding layer which has a low transmittance, and the problem also arises that there is an increase in transmission loss.

In order to improve these characteristics, measures such as forming the core as a multilayer structure, or forming the core as a grated index (GI) type structure have been employed. However, these measures involve complex manufacturing processes, and therefore tend to increase cost.

Furthermore, because the temperature dependency of the refractive index of a polymer material is considerable compared to that of quartz glass, the problem arises that $\Delta$ is changed in accordance with the operating temperature, which causes a change in the optical characteristics. Depending on the refractive index of the polymer cladding material at normal temperature and on the temperature dependency of the refractive index, the $\Delta$ between the core and the cladding may be zero in low temperature areas, which may cause the light not to be guided. In order to avoid this, a structure including two layers of the quartz glass core has been proposed. However, no description is given regarding suitable parameters and no mention is made regarding characteristics such as bending loss and the capacity of transmission over the entire operating temperature range.

The present invention was conceived in view of the above described circumstances and it is an object thereof to provide a PCF which can be manufactured at low cost, and which has no deterioration of the capacity of transmission over the entire operating temperature range and no increase in bending loss.

Means for Solving the Problem

In order to achieve the above described object, the present invention is a polymer clad optical fiber which includes: an outer core provided on an outer circumference of an inner core formed from quartz glass, the outer core being formed from fluorine-doped glass having a refractive index lower than the refractive index of the inner core; and a polymer cladding provided on an outer circumference of the outer core and formed from a polymer, wherein if the diameter of the inner core is taken as $a_1$, and the diameter of the outer core is taken as $a_2$, and a cross-sectional area of the inner core is taken as $(\pi a_1^2)/4$, and a cross-sectional area of the outer core is taken as $(\pi a_2^2)/4$, then a parameter X which is defined as X $(=a_2^2/a_1^2)$ is within a range of $1.8 \leq X \leq 2.2$, and wherein if a relative refractive index difference between the inner core and the outer core is taken as $\Delta_1$, if a relative refractive index difference between the outer core and the cladding is taken as $\Delta_2$, if a relative refractive index difference between the outer core and the polymer cladding at a high temperature is taken as $\Delta_2$ max, if a relative refractive index difference between the outer core and the polymer cladding at a low temperature is taken as $\Delta_2$ min, and if a parameter Y is defined as $Y=\Delta_1/\Delta_2$, $Ymax=\Delta_2$ max/$\Delta_2$ at a high temperature, and $Ymin=\Delta_2$ min/$\Delta_1$ at a low temperature, then a relationship is established in which, when the parameter X is within a range of $1.8 \leq X \leq 2.0$, the Ymin is $0.25 \leq Ymin \leq 0.84X-0.68$, and the Ymax is $0.25 \leq Ymax \leq 0.84X-0.68$, and, when X is within a range of $2.0 \leq X \leq 2.2$, the Ymin is $0.48X-0.71 \leq Ymin \leq -2/9X+13/9$, and the Ymax is $0.48X-0.71 \leq Ymax \leq -2/9X+13/9$.

Preferably, for the parameter Y, Y min<Y max is satisfied.

Moreover, preferably, the inner core refractive index is set to substantially the same as the refractive index of pure quartz glass, and the outer core refractive index is set to between 1.42 or more and the level of pure quartz glass or less.

Effects Of The Invention

The PCF of the present invention can be manufactured at low cost, which has no deterioration of the capacity of transmission over the entire operating temperature range and no increase in bending loss.

The above described aims, actions and effects of the present invention as well as any other aims, actions, and effects thereof will be clear to any person skilled in the art from the attached drawings and from the description of the embodiments of the invention given below.

BEST EMBODIMENTS FOR CARRYING OUT THE INVENTION

Figure 1:
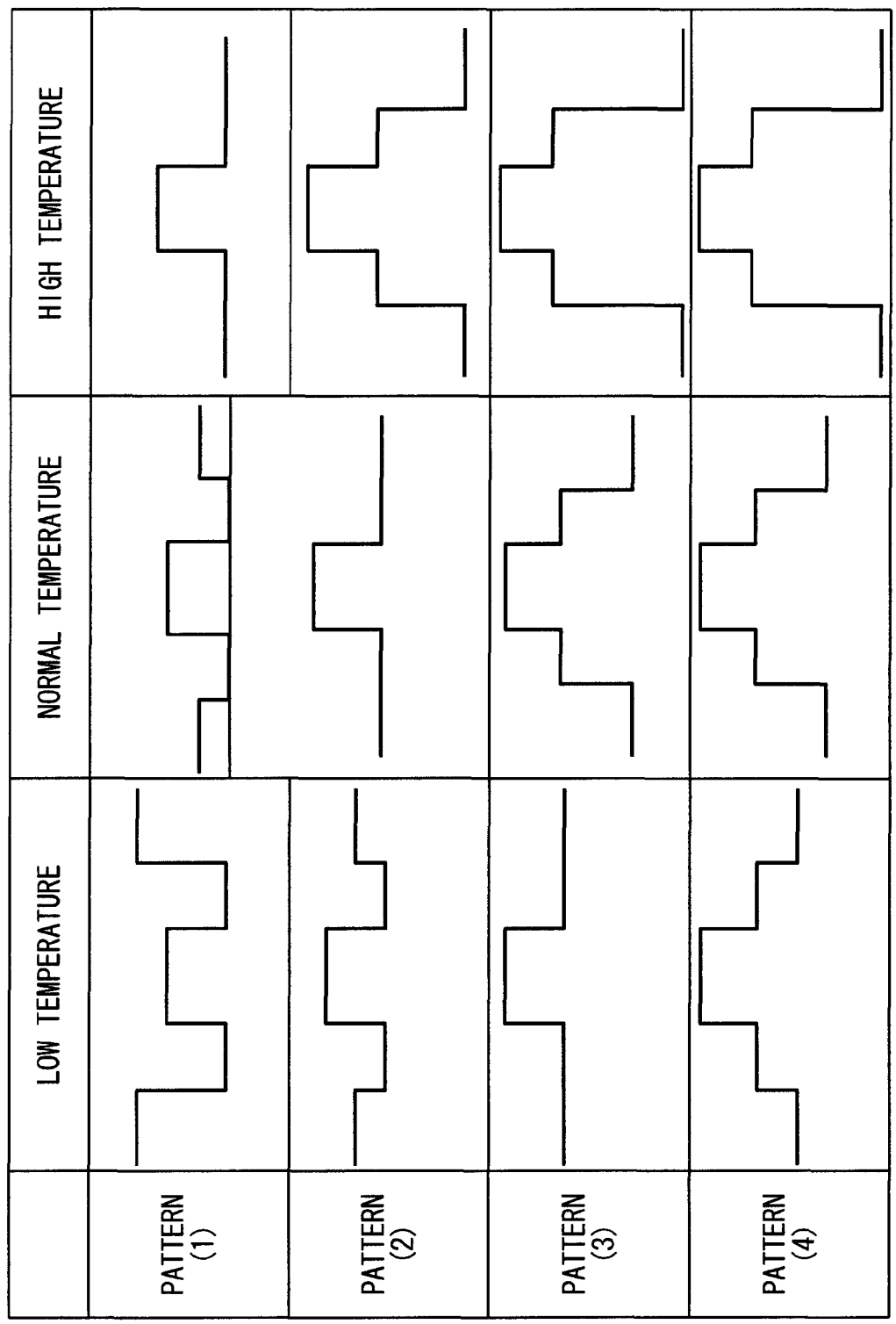
FIG. 1 is a view showing schematically changes in a refractive index in the radial direction of a PCF which are caused by temperature changes in a polymer cladding material.

In the PCF (polymer clad optical fiber) of the present invention, an improvement in temperature characteristics is achieved by providing the structure described below in a two-layer glass core PCF which includes a two-layer glass core (i.e., an inner core and an outer core) which is formed from quartz glass or additive-doped glass, and includes a polymer cladding which is provided around an outer circumference of the core. Here, it is necessary for the inner core and the outer core to include glass having quartz glass as the main component thereof, and it is necessary for the temperature dependency of the refractive index of the inner core and the outer core to be sufficiently smaller than that of the polymer cladding. Because of this, it is not possible for a polymer cladding material to be used particularly in the outer core. The diameter of the inner core is taken as $a_1$ and the diameter of the outer core is taken as $a_2$, and a ratio of a cross-sectional area of the inner core $(\pi a_1^2)/4$ to a cross-sectional area of the outer core $(\pi a_2^2)/4$ is taken as X $(=a_2^2/a_1^2)$. Changes in the refractive index profile which may be caused by changes in temperature are shown in FIG. 1.

A maximum temperature at which it is assumed the PCF will be used is taken as Tmax, while a minimum temperature thereof is taken as Tmin. If the refractive index of the polymer cladding material at normal temperature (assumed to be 20° C.) is taken as $n_0$, and a temperature coefficient of the refractive index is taken as dn/dT, then a refractive index $n_x$ of the polymer cladding material at X° C. can be expressed by Formula (1) given below.

(Formula (1))

$$n_x = n_0 + \int_{20}^{x} \frac{dn}{dT} dT \quad (1)$$

In this case, if the difference between the refractive indexes of the inner core and the outer core is taken as $\Delta_1$, and the difference between the refractive indexes of the outer core and the polymer cladding is taken as $\Delta_2$, then $\Delta_1$ and $\Delta_2$ can be expressed by the following Formula (2) and Formula (3).

(Formula (2))

$$\Delta_1 = \frac{n_{core1}^2 - n_{core2}^2}{2n_{core1}^2} \quad (2)$$

(Formula (3))

$$\Delta_2 = \frac{n_{core2}^2 - n_x^2}{2n_{core2}^2} \quad (3)$$

The PCF of the present invention is characterized in that, if a ratio between $\Delta_1$ and $\Delta_2$ is set as Y $(=\Delta_2/\Delta_1)$, and if Y is taken as Ymax=$\Delta_2$ max/$\Delta_1$, and Ymin=$\Delta_2$ min/$\Delta_1$, with the difference between the refractive indexes of the outer core and the polymer cladding at Tmax being taken as $\Delta_2$ max and the difference between the refractive indexes of the outer core and the polymer cladding at Tmin being taken as $\Delta_2$ min, then X is within a range of $1.8 \leq X \leq 2.2$, and when X is within a range of $1.8 \leq X \leq 2.0$, Ymin is $0.25 \leq Ymin \leq 0.84X - 0.68$, and when X is within a range of $2.0 \leq X \leq 2.2$, Ymin is $0.48X - 0.71 \leq Ymin \leq -2/9X + 13/9$, and Ymax is $0.48X - 0.71 \leq Ymax \leq -2/9X + 13/9$.

By employing the above described design, although Δ does change due to temperature dependency, the amount of this change can be held equivalent to the transmission speed between the glass inner core and the glass outer core in which Δ does not change, and the effect is obtained that it is possible to ignore the effect of changes in the refractive index due to temperature. Outside this range, because adjustment of $\Delta_1$ is not practical, because there is a deterioration in the transmission speed, or because the refractive indexes of the outer core and the cladding become inverted, there is no advantage in using a two-layer core.

In order to adjust $\Delta_1$, it is desirable for the refractive index of the inner core to be approximately that of pure quartz glass, and for the refractive index of the outer core to be 1.42 or more.

It is also desirable for the parameter Y to be set such that Ymin<Ymax is satisfied.

It is preferable that the present invention is applied to a material whose temperature dependency of the refractive index of the polymer cladding is such that the refractive index becomes lower as the temperature rises and the refractive index becomes higher as the temperature falls. In this manner, by employing this type of structure, there is a temperature dependency in the reverse direction from the temperature dependency of the refractive index of the quartz glass (i.e., the refractive index of the quartz glass increases as the temperature rises), and the effect of applying the present invention is particularly increased.

FIG. 1 is a view showing schematically changes in the refractive index in a radial direction of a PCF which are caused by temperature changes in the case of a polymer cladding material in which the refractive index becomes lower as the temperature rises. The refractive indexes of the inner core and the outer core which are made of quartz glass exhibit substantially no changes between being at normal temperature, at low temperature, and at high temperature. However, the refractive index of the polymer cladding changes at both a low temperature and a high temperature relative to normal temperature, so that the Δ between the outer core and the polymer cladding varies.

In Pattern (1), at normal temperature, the refractive index of the central inner core is the highest, and the refractive index of the outer core outside the inner core is the lowest, and the refractive index of the polymer cladding outside the outer core is between the two. Because the refractive index of the polymer cladding varies in accordance with the temperature, the refractive index of the polymer cladding is the highest at a low temperature, while the refractive indexes of the outer core and the polymer cladding are equal to each other at a high temperature.

Pattern (2) shows a case in which a polymer cladding is used which has a refractive index equal to that of the outer core at normal temperature. In this case, at a low temperature, the refractive index of the polymer cladding takes a value in the middle between the refractive index of the inner core and the refractive index of the outer core. At a high temperature, the refractive index of the polymer cladding is lower than the refractive index of the outer core.

Pattern (3) shows a case in which a polymer cladding is used which has a refractive index lower than that of the outer core at normal temperature. In this case, at a low temperature, the refractive index of the polymer cladding is equivalent to the refractive index of the outer core. At a high temperature, the refractive index of the polymer cladding is lower than the refractive index of the outer core.

Pattern (4) shows a case in which a polymer cladding is used which has a refractive index lower than that of the outer core at normal temperature, and in which the change in the refractive index is greater than that of the Pattern (3). In this case, at a low temperature, the refractive index of the polymer cladding is lower than that of the outer core. At a high temperature, the refractive index of the polymer cladding is lower than the refractive index of the outer core.

EXAMPLES

As is shown in Table 1, a PCF was manufactured by forming a glass inner core from quartz glass (having a refractive index of $n_1$) having a diameter of $a_1$, and by providing an outer core formed from quartz glass (having a refractive index of $n_2$) having a diameter of $a_2$ on an outer circumference of the inner core, and by then also providing a polymer cladding (having a refractive index of $n_3$) on the outer circumference of the outer core. The refractive index of the inner core was adjusted using dopants such as chlorine, fluorine, Ge, and phosphorous. The refractive index of the outer core was adjusted using dopants such as fluorine and boron. Moreover, the material used for the polymer cladding material was suitably chosen with the consideration of the refractive index at normal temperature and temperature-dependent changes in the refractive index thereof, and then evaluation was made.

Eleven types of experimental optical fiber, namely, the optical fibers of the Examples 1 to 5, and the optical fibers of the Comparative examples 1 to 6 were prepared.

TABLE 1

| Ex. No. | Polymer cladding material | Operating environment temperature [° C.] | a1 [μm] | a2 [μm] | n1 | n2 | Normal temp. n3 Low temp High temp. | Δ1 [%] | Normal temp. Δ2 [%] Low temp. High temp. | X | Normal temp. Y Low temp. High temp. | Stipulated range of Y during X | Normal temp. band [MHz km] Low temp. High temp | Low temp. bending loss |
|---|---|---|---|---|---|---|---|---|---|---|---|---|---|---|
| Ex. 1 | A | −40~85 | 88 | 125 | 1.453 | 1.421 | 1.402 1.413 1.391 | 2.2 | 1.3 0.55 2.2 | 2 | 0.59 0.25 1.0 | 0.25-1 | 13.3 11.1 11.3 | Y |
| Ex. 2 | B | −10~60 | 149 | 200 | 1.462 | 1.436 | 1.424 1.429 1.417 | 1.8 | 0.8 0.45 1.34 | 1.8 | 0.53 0.25 0.74 | 0.25-0.832 | 17.1 15.4 15.9 | Y |
| Ex. 3 | C | 0~50 | 67 | 100 | 1.457 | 1.442 | 1.433 1.436 1.428 | 1.06 | 0.62 0.415 1.01 | 2.2 | 0.58 0.391 9.53 | 0.346-0.956 | 27.1 24.5 24.4 | Y |
| Comp. Ex. 1 | D | −40~85 | 88 | 125 | 1.453 | — | 1.421 1.432 1.410 | — | 2.2 1.4 3.0 | 2 | — | — | 11.0 16.9 8.13 | N |
| Comp. Ex. 2 | E | −10~60 | 149 | 200 | 1.462 | — | 1.436 1.441 1.429 | — | 1.8 1.4 2.3 | 1.8 | — | — | 13.6 16.9 10.7 | N |
| Comp. Ex. 3 | F | 0~50 | 67 | 100 | 1.457 | — | 1.442 1.446 1.437 | — | 1.06 0.80 1.43 | 2.2 | — | — | 23.8 32.5 17.8 | N |
| Comp. Ex. 4 | G | −40~85 | 88 | 125 | 1.454 | 1.425 | 1.407 1.418 1.396 | 2.0 | 1.3 0.48 2.1 | 2 | 0.65 0.24 1.05 | 0.25-1 | 14.6 12.15 12.0 (12.2) | Y |
| Comp. Ex. 5 | H | −10~60 | 153 | 200 | 1.458 | 1.435 | 1.424 1.430 1.413 | 1.57 | 0.8 0.35 1.52 | 1.7 | 0.51 0.22 0.97 | 0.25-0.748 | 19.6 13.3 15.3 (15.4) | Y |
| Comp. Ex. 6 | I | 0~50 | 66 | 100 | 1.458 | 1.442 | 1.433 1.437 1.426 | 1.08 | 0.62 0.336 1.1 | 2.3 | 0.574 0.311 1.02 | 0.394-0.933 | 24.7 20.7 21.9 (22.3) | Y |

Example 1

Using polymer cladding material A, evaluation was made assuming an operating temperature range of −40~+85° C. From Table 1, it can be seen that because the core cross-sectional area ratio X and the relative refractive index difference ratio Y are within appropriate ranges, there is little temperature-dependent change in the capacity of transmission. Furthermore, a superior fiber having small bending loss in a low temperature environment was obtained. Moreover, the capacity of transmission was also maintained equal to or more than that of the single layer core structure optical fiber shown in Comparative example 1 at normal temperature.

Example 2

Using polymer cladding material B, evaluation was made assuming an operating temperature range of −10~+60° C. From Table 1, it can be seen that because the core cross-sectional area ratio X and the relative refractive index difference ratio Y are within appropriate ranges, there is little temperature-dependent change in the capacity of transmission. Furthermore, a superior fiber having small bending loss in a low temperature environment was obtained. Moreover, the capacity of transmission was also maintained equal to or more than that of the single layer core structure optical fiber shown in Comparative example 2 at normal temperature.

Example 3

Using polymer cladding material C, evaluation was made assuming an operating temperature range of 0~+50° C. From Table 1, it can be seen that because the core cross-sectional area ratio X and the relative refractive index difference ratio Y are within appropriate ranges, there is little temperature-dependent change in the capacity of transmission. Furthermore, a superior fiber having small bending loss in a low temperature environment was obtained. Moreover, the capacity of transmission was also maintained equal to or more than that of the single layer core structure optical fiber shown in Comparative example 3 at normal temperature.

Example 4

Using polymer cladding material J, evaluation was made assuming an operating temperature range of −40~0° C. From Table 2, it can be seen that because the core cross-sectional area ratio X and the relative refractive index difference ratio Y are within appropriate ranges (because the normal temperature is outside the assumed temperature range, the bandwidth is narrow), there is little temperature-dependent change in the capacity of transmission. Furthermore, a superior fiber having small bending loss in a low temperature environment was obtained. Moreover, the capacity of transmission was also maintained equal to or more than that of the single layer core structure optical fiber (having a cladding refractive index of 1.44 at normal temperature) which has a transmission speed of 27.5 MHz at normal temperature.

Example 5

Using polymer cladding material K, evaluation was made assuming an operating temperature range of 60~100° C. From Table 2, it can be seen that because the core cross-sectional area ratio X and the relative refractive index difference ratio Y are within appropriate ranges (because the normal temperature is outside the assumed temperature range, the bandwidth is narrow), there is little temperature-dependent change in the capacity of transmission. Furthermore, a superior fiber having small bending loss in a low temperature environment was obtained. Moreover, the capacity of transmission was also maintained equal to or more than that of the single layer core structure optical fiber (having a cladding refractive index of 1.43 at normal temperature) which has a transmission speed of 13.1 MHz at normal temperature.

Comparative Example 1

Using polymer cladding material D as a comparative example for comparison to Example 1, evaluation was made assuming an operating temperature range of −40~+85° C. For the comparison, a single layer core structure optical fiber having an inner core and polymer cladding was used. From Table 1, it can be seen that because the structure is a single layer core structure, there is a large temperature-dependent change in the capacity of transmission, and there is a conspicuous decrease in the capacity of transmission particularly at high temperatures. Furthermore, a fiber having large bending loss in a low temperature environment was obtained.

TABLE 2

| Ex. No. | Polymer cladding material | Operating environment temperature [° C.] | a1 [μm] | a2 [μm] | n1 | n2 | Normal temp. n3 Low temp High temp. | Δ1 [%] | Normal temp. Δ2 [%] Low temp. High temp. | X | Normal temp. Y Low temp. High temp. | Stipulated range of Y during X | Normal temp. band [MHz km] Low temp. High temp |
|---|---|---|---|---|---|---|---|---|---|---|---|---|---|
| Ex. 4 | J | 40~0 | 58 | 80 | 1.453 | 1.44 | 1.425 | 0.89% | 1.04% | 1.9 | 1.18 | 0.25-0.916 | 24.3 |
|  |  |  |  |  |  | 1.44 | 1.436 |  | 0.28% |  | 0.31 |  | 30.4 |
|  |  |  |  |  |  | 1.44 | 1.429 |  | 0.76% |  | 0.85 |  | 30.0 |
| Ex. 5 | K | 80~100 | 103 | 150 | 1.457 | 1.43 | 1.425 | 1.84% | 0.35% | 2.1 | 0.89 | 0.298-0.978 | 12.0 |
|  |  |  |  |  |  | 1.43 | 1.422 |  | 0.56% |  | 0.30 |  | 13.1 |
|  |  |  |  |  |  | 1.43 | 1.405 |  | 1.73% |  | 0.94 |  | 13.6 |

Comparative Example 2

Using polymer cladding material E as a comparative example for comparison to Example 2, evaluation was made assuming an operating temperature range of −10~+60° C. For the comparison, a single layer core structure optical fiber having an inner core and polymer cladding was used. From Table 1, it can be seen that because the structure is a single layer core structure, there is a large temperature-dependent change in the capacity of transmission, and there is a conspicuous decrease in the capacity of transmission particularly at high temperatures. Furthermore, a fiber having large bending loss in a low temperature environment was obtained.

Comparative Example 3

Using polymer cladding material F as a comparative example for comparison to Example 3, evaluation was made assuming an operating temperature range of 0~+50° C. For the comparison, a single layer core structure optical fiber having an inner core and polymer cladding was used. From Table 1, it can be seen that because the structure is a single layer core structure, there is a large temperature-dependent change in the capacity of transmission, and there is a conspicuous decrease in the capacity of transmission particularly at high temperatures. Furthermore, a fiber having large bending loss in a low temperature environment was obtained.

Comparative Example 4

Using polymer cladding material G, evaluation was made assuming an operating temperature range of −40~+85° C. From Table 1, it can be seen that because the core cross-sectional area ratio X and the relative refractive index difference ratio Y are not within appropriate ranges, at low temperatures and at high temperatures, the capacity of transmission is narrower compared to a single layer core fiber at normal temperature (shown inside the brackets). However, because the structure is a two-layer core structure, a fiber having small bending loss in a low temperature environment was obtained.

Comparative Example 5

Using polymer cladding material H, evaluation was made assuming an operating temperature range of −10~+60° C. From Table 1, it can be seen that because the core cross-sectional area ratio X and the relative refractive index difference ratio Y are not within appropriate ranges, at low temperatures and at high temperatures, the capacity of transmission is narrower compared to a single layer core fiber at normal temperature (shown inside the brackets). However, because the structure is a two-layer core structure, a fiber having small bending loss in a low temperature environment was obtained.

Comparative Example 6

Using polymer cladding material I, evaluation was made assuming an operating temperature range of 0~+50° C. From Table 1, it can be seen that because the core cross-sectional area ratio X and the relative refractive index difference ratio Y are not within appropriate ranges, at low temperatures and at high temperatures, the capacity of transmission is narrower compared to a single layer core fiber at normal temperature (shown inside the brackets). However, because the structure is a two-layer core structure, a fiber having small bending loss in a low temperature environment was obtained.

From the above described results, it can be seen that if X and Y are within appropriate ranges, compared with a single layer core Δ1 fiber, the capacity of transmission is excellent over the entire operating temperature range, and a fiber having small bending loss is obtained.

The present invention has been described and illustrated in detail above with reference made to specific embodiments, however, this description should not be interpreted as having a limiting meaning, and other examples and the like of the present invention may become clear to those skilled in the art if they refer to the present specification. Namely, various modifications may be made to the disclosed contents, and a variety of modifications may be made insofar as they do not depart from the range of the invention as described in the range of the claims of this application.

INDUSTRIAL APPLICABILITY

It is possible to provide a polymer clad optical fiber which can be manufactured at low cost and which has no increase in bending loss and no deterioration in the capacity of transmission over the entire operating temperature range.

The invention claimed is:

1. A polymer clad optical fiber comprising: an outer core provided on an outer circumference of an inner core formed from quartz glass, the outer core being formed from fluorine-doped glass having a refractive index lower than that the refractive index of the inner core; and a polymer cladding provided on an outer circumference of the outer core and formed from a polymer, wherein if the diameter of the inner core is taken as $a_1$, and the diameter of the outer core is taken as $a_2$, and a cross-sectional area of the inner core is taken as $(\pi a_1^2)/4$, and a cross-sectional area of the outer core is taken as $(\pi a_2^2)/4$, then a parameter X defined as $X(=a_2^2/a_1^2)$ is within a range of $1.8 \leq X \leq 2.2$, and wherein if a relative refractive index difference between the inner core and the outer core is taken as $\Delta_1$, if a relative refractive index difference between the outer core and the cladding is taken as $\Delta_2$, if a relative refractive index difference between the outer core and the polymer cladding at a high temperature is taken as $\Delta_2 max$, if a relative refractive index difference between the outer core and the polymer cladding at a low temperature is taken as $\Delta_2 min$, and if a parameter Y is defined as $Y = \Delta_1/\Delta_2$, $Ymax = \Delta_2 max/\Delta_2$ at a high temperature, and $Ymin = \Delta_2 min/\Delta_1$ at a low temperature, then a relationship is established in which, when the parameter X is within a range of $1.8 \leq X \leq 2.0$, the Ymin is $0.25 \leq Ymin \leq 0.84X - 0.68$, and the Ymax is $0.25 \leq Ymax \leq 0.84X - 0.68$, and, when X is within a range of $2.0 \leq X \leq 2.2$, the Ymin is $0.48X - 0.71 \leq Ymin \leq -2/9X + 13/9$, and the Ymax is $0.48X - 0.71 \leq Ymax \leq -2/9X + 13/9$.

2. The polymer clad optical fiber according to claim 1, wherein for the parameter Y, Ymin<Ymax is satisfied.

3. The polymer clad optical fiber according to claim 2, wherein the inner core refractive index is set to substantially the same as the refractive index of pure quartz glass, and the outer core refractive index is set to between 1.42 or more and the level of pure quartz glass or less.

\* \* \* \* \*

UNITED STATES PATENT AND TRADEMARK OFFICE
CERTIFICATE OF CORRECTION

| | | |
|---|---|---|
| PATENT NO. | : 7,680,390 B2 | Page 1 of 1 |
| APPLICATION NO. | : 12/439376 | |
| DATED | : March 16, 2010 | |
| INVENTOR(S) | : Kenji Okada et al. | |

It is certified that error appears in the above-identified patent and that said Letters Patent is hereby corrected as shown below:

In the Specification:
Column 2, line 43, delete "$Y = \Delta_1 / \Delta_2$, $Y\text{max} = \Delta_2\text{max} / \Delta_2$" and insert --$Y = \Delta_2 / \Delta_1$, $Y\text{max} = \Delta_2 \text{max} / \Delta_1$--.

Claim 1:
Column 10, line 29, delete "$Y = \Delta_1 / \Delta_2$" and insert --$Y = \Delta_2 / \Delta_1$--; line 30, delete "$Y\text{max} = \Delta_2 \text{max} / \Delta_2$" and insert --$Y\text{max} = \Delta_2 \text{max} / \Delta_1$--.

Signed and Sealed this
Twenty-first Day of February, 2012

David J. Kappos
*Director of the United States Patent and Trademark Office*